US006236745B1

(12) United States Patent
Chen et al.

(10) Patent No.: US 6,236,745 B1
(45) Date of Patent: *May 22, 2001

(54) METHOD AND APPARATUS FOR SCREENING DOCUMENTS

(75) Inventors: Haibo Chen, Leeds; James R. Hewit, Newport-on-Tay, both of (GB)

(73) Assignee: NCR Corporation, Dayton, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/919,650

(22) Filed: Aug. 28, 1997

(30) Foreign Application Priority Data

Feb. 15, 1997 (GB) ..................................................... 9703191

(51) Int. Cl.[7] ...................................................... G06K 9/00

(52) U.S. Cl. ......................... 382/135; 382/137; 382/254; 382/266; 382/295

(58) Field of Search .................................... 382/135, 136, 382/137, 155, 156, 157, 295, 296, 254, 266, 112

(56) References Cited

U.S. PATENT DOCUMENTS

| | | | | |
|---|---|---|---|---|
| 3,800,155 | | 3/1974 | Potenza . | |
| 4,298,807 | * | 11/1981 | Favre | 250/559.1 |
| 4,429,991 | * | 2/1984 | Williams | 356/73 |
| 4,493,994 | * | 1/1985 | Hilton | 250/572 |
| 4,559,451 | | 12/1985 | Curl . | |
| 4,984,280 | | 1/1991 | Abe | 382/135 |
| 5,055,834 | | 10/1991 | Chiba . | |
| 5,084,628 | * | 1/1992 | Burge et al. | 250/571 |
| 5,206,744 | * | 4/1993 | Kamada et al. | 358/488 |
| 5,522,491 | | 6/1996 | Baudat et al. . | |
| 5,533,144 | * | 7/1996 | Fan | 382/135 |
| 5,687,250 | * | 11/1997 | Curley et al. | 382/112 |
| 5,692,065 | * | 11/1997 | Prakash et al. | 382/112 |
| 5,729,623 | * | 3/1998 | Omatu | 382/155 |
| 5,774,635 | * | 6/1998 | Kuusisto et al. | 395/106 |
| 5,796,410 | * | 8/1998 | Baird | 345/471 |
| 5,815,198 | * | 9/1998 | Vachtsevanos et al. | 348/86 |
| 5,959,290 | * | 9/1999 | Schweid et al. | 250/208.1 |

FOREIGN PATENT DOCUMENTS 2284293 5/1995 (GB) .

* cited by examiner

*Primary Examiner*—Matthew C. Bella
*Assistant Examiner*—Sheela Chawan
(74) *Attorney, Agent, or Firm*—Michael Chan

(57) ABSTRACT

A method and apparatus for screening documents such as bank notes 1 for suitability for continued circulation, in which a damage index is computed for each document from a number of factors comprising a shape factor, an orientation factor, a size factor and a location factor developed for each defect in the document. Shape and rotation factors are obtained by applying Fourier and/or Wavelet transforms to sets of contour signals developed on scanning a document for defects using an optical scanner (6).

12 Claims, 3 Drawing Sheets

METHOD AND APPARATUS FOR SCREENING DOCUMENTS

BACKGROUND OF THE INVENTION

This invention relates generally to a method and apparatus for screening documents, and has application to a method and apparatus for screening bank notes for defects to determine their suitability for dispensing by automated teller machines (ATMs).

In the course of circulation, bank notes may acquire defects such as holes and tears and, as such defects accumulate, a point is reached when a note becomes unsuitable for dispensing to bank customers by an ATM. It is accordingly common practice to employ bank note screening apparatus to test bank notes for defects prior to loading into a storage cassette of an ATM for subsequent dispensing. Also some ATMs are equipped with screening devices which test deposited notes for suitability for further circulation.

Known bank note screening systems, such as that disclosed in U.S. Pat. No. 4,984,280, include a scanner, typically employing photoelectric detection of transmitted light, for determining the condition of a note. A disadvantage of known systems of this kind is that they do not specifically determine the suitability of bank notes for handling by the cash dispensing mechanism of an ATM.

SUMMARY OF THE INVENTION

It is an object of the present invention to provide an improved method and apparatus for screening documents such as bank notes which permit accurate control of document acceptance and rejection.

According to one aspect of the invention, there is provided a method of screening documents comprising the steps of scanning a document to detect defects in the document and to provide data representing the significance of such defects, characterized by the steps of developing, from said data, factors representing the configuration of each defect, and computing, from the factors developed for each defect detected in the document, a damage index for the entire document on the basis of which a determination is made as to whether or not to reject the document.

It should be understood that by factors representing the configuration of each defect is meant two or more factors respectively representing the size, location, shape and orientation of each defect.

According to another aspect of the invention, there is provided a document screening apparatus comprising a defect detector, document feeding means adapted to present documents for screening to said defect detector, the defect detector being adapted to develop, for each document presented thereto, data representing the significance of defects in the document, characterized by data processing means arranged to derive, from said data, factors representing the configuration of each detected defect, and arranged, in response to the factors developed for each defect in the document, to compute a damage index for the document on the basis of which a determination is made as to whether or not to reject the document.

BRIEF DESCRIPTION OF THE DRAWINGS

An embodiment of the invention will now be described by way of example with reference to the accompanying drawings, in which.

DETAILED DESCRIPTION

In the present embodiment, defects in the form of holes in bank notes are detected. However, it should be understood that a method and apparatus in accordance with the invention can be used to detect other types of defects, such as tears, in documents.

Figure 1:
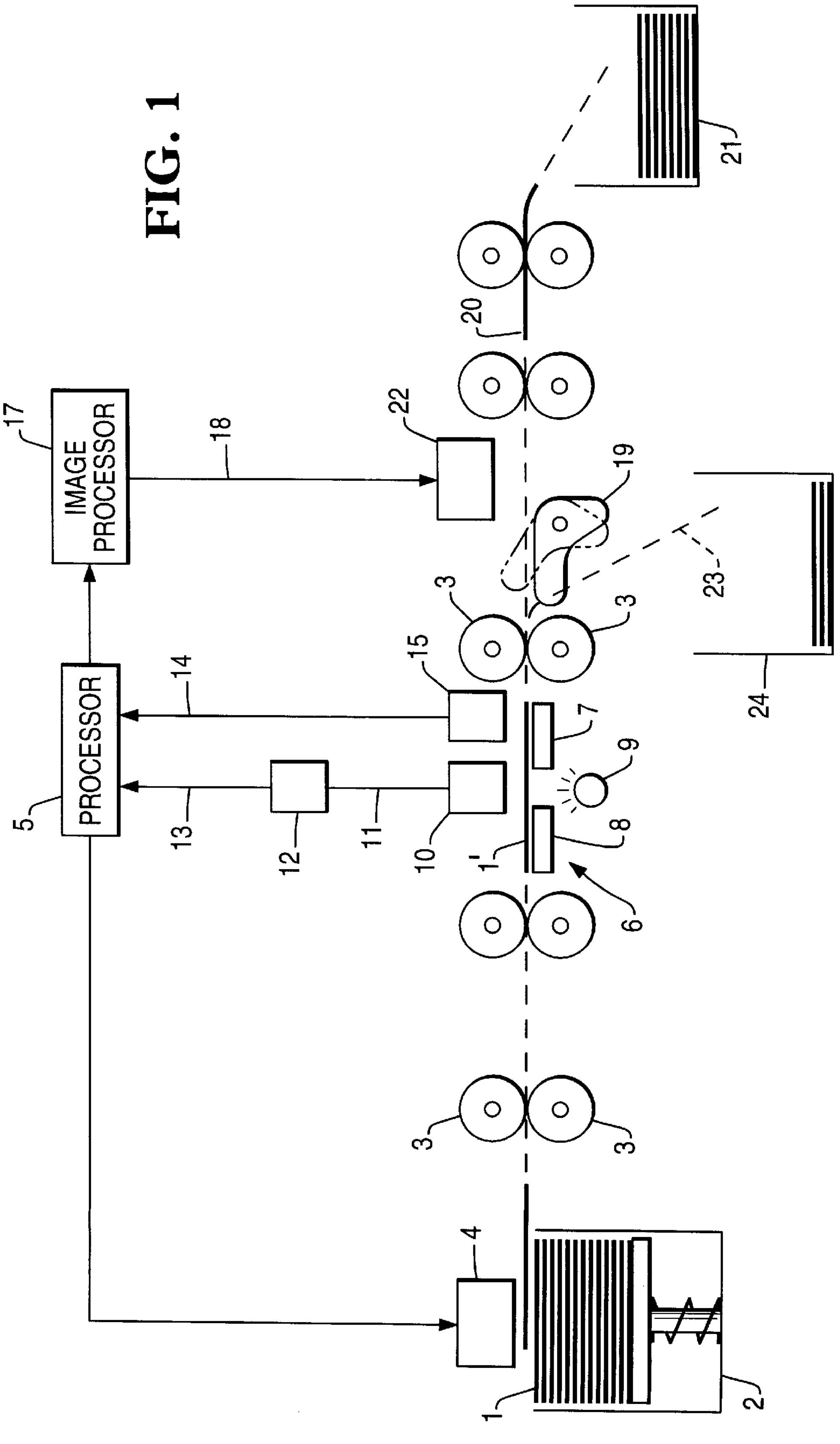
FIG. 1 is a schematic diagram of an apparatus in accordance with the invention showing the basic components thereof.

Referring first to FIG. 1, bank notes 1 for screening are fed from an input hopper 2 to scanner feed rolls 3 by pick means 4 operated under the control of data processing means 5 to feed one note at a time to a scanner 6. The scanner 6 includes a support table 7 in which is formed a scanning slit 8 through which a light source 9, typically a linear fluorescent lamp, directs light on to a scanned note 1'. The scanner 6 also includes a linear detector 10 incorporating a charged coupled device (CCD) light detector arranged to receive light transmitted through the note 1' and to transmit on an output line 11 a pattern of signals representing the light transmitted by each of a number of pixel areas linearly located across the width of the note 1'. These signals are applied to a threshold circuit 12 to develop on an input line 13 a series of binary signals indicating whether a particular pixel corresponds to a hole in the note 1' or not. These binary signals are applied to the data processing means 5 wherein they are combined with note location signals received over a line 14 from note sensing means 15, positioned adjacent the note transport mechanism, to produce data locating each pixel two dimensionally on the scanned note 1'. This data is applied to an image processor 17, formed by further data processing means, which develops contour signals from the pixel data for each hole detected and computes shape, rotation, size and location factors for each hole. When a complete note has been scanned, the image processor 17 computes a damage index for the entire note, this damage index being dependent on the shape, rotation, size and location of the or each hole detected during the scanning of the note, as will be explained in more detail later. The image processor 17 applies a signal to a line 18 if the computed damage index exceeds a predetermined threshold. A divert member 19 is positioned in the output path of the scanner 6 so as normally to allow scanned bank notes to pass along an accept path 20 to an accept hopper 21. However, when actuated by an associated actuator 22 the divert number 19 is moved into a position shown in chain outline in FIG. 1 in which it deflects the scanned note along a reject path 23 to a reject hopper 24. The actuator 22 is connected to operate under the control of signals on the line 18, and accordingly when a scanned note exhibits a damage index higher than the predetermined threshold it is deflected into the reject hopper 24.

Figure 2:
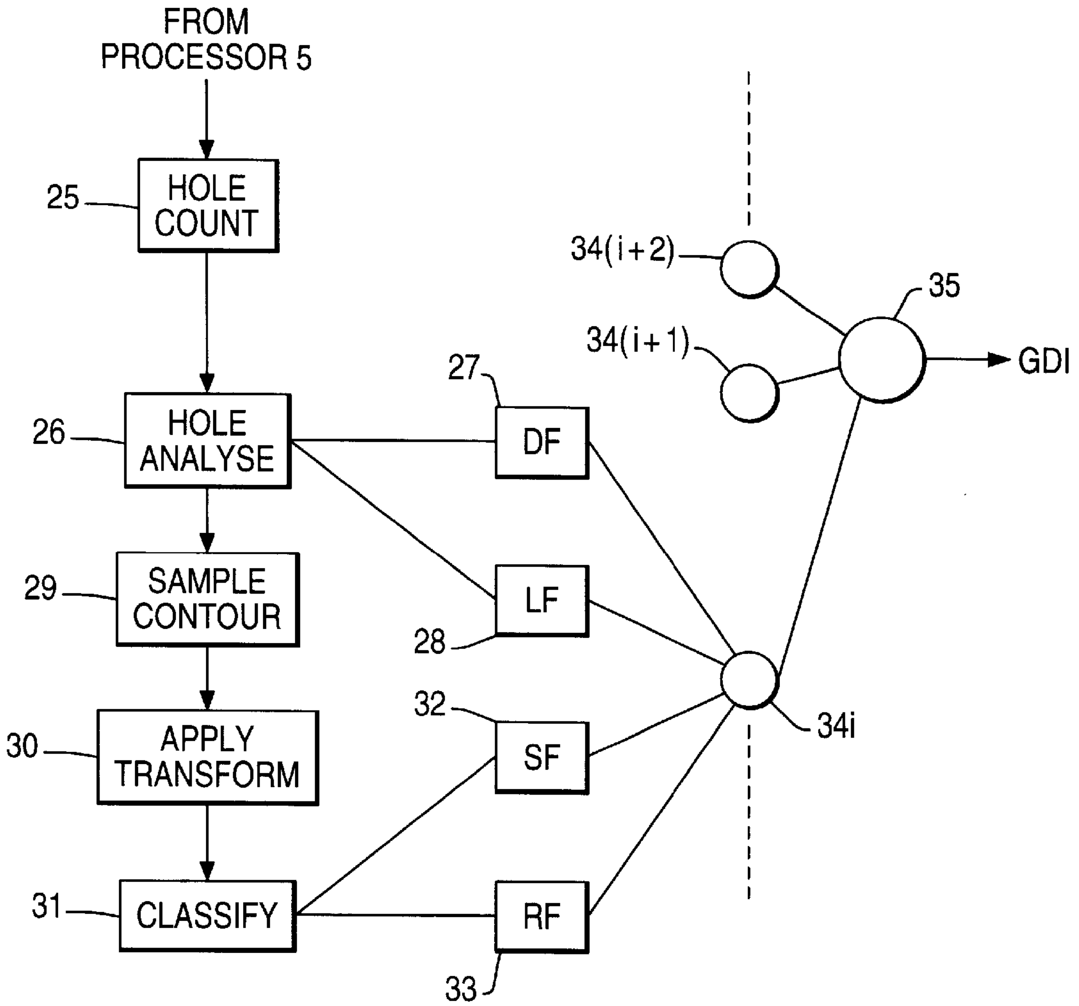
FIG. 2 is a flow diagram showing the procedures performed on image data obtained by a document scanner in the apparatus of FIG. 1.

FIG. 2 shows in greater detail the operations performed in the image processor 17. The output from the threshold circuit 12 is processed by the data processing means 5 to produce a digital map of the scanned note. Data representing this digital map is applied to the image processor 17 which makes a computation at step 25 of the total number of holes detected. This computation involves analyzing pixel arrays corresponding to holes. The following algorithm is applied:

1. If two such spaced pixel arrays are in the same line, they belong to different groups (i.e. different holes).

2. If two such arrays are in adjacent lines and adjoin each other they belong to the same group (i.e. the same hole); otherwise they do not.
3. If two such arrays are neither in the same line nor in the adjacent line they belong to different groups (i.e. different holes).

The number of separate groups so identified thus provides a measurement of the number of holes. Next, at step 26, each hole identified in step 25 is examined in turn. First a simple count is made of the number of pixels associated with the hole being examined to provide a measure of the dimension (i.e. size) of the hole which is registered at step 27 as the dimension factor DF. Then, by a process of sampling of the individual pixels representing the hole, a location factor LF is developed representing the position of the hole on the note. This is registered at step 28.

Next, at step 29, the periphery of each hole is identified by selecting those pixels which occur at the transition between pixels corresponding to hole free portions of the note and those corresponding to the hole. The centroid of the hole is located by averaging the x and y co-ordinate values of the pixels associated with the hole. Using angular sampling, contour signals are then developed which describe the shape of the contour by a series of signals representing the distance between the sampling points and the centroid of the contour at particular angles. These distances form a one dimensional function of angle as the angle goes from 0 to 360 degrees.

The contour signals are stored and normalized and are then transformed at step 30 to produce a set of transform coefficients which represent the shape of the hole in a condensed form. For example, in known manner, by using a Fourier transform a shape description can be changed from a large number of amplitude values to a relatively small number of coefficients.

The use of a Fourier transform to develop descriptors representing the shapes of closed curves is described in the paper entitled "Fourier Descriptors for Plane Closed Curves" by Charles T. Zahn and Ralph Z. Roskies in IEEE Transactions on Computers, Vol. c-21, No 3, March 1972 pp 269–281.

The present embodiment of the invention, in addition to providing for the application of a Fourier transform to produce coefficients at step 30, also takes advantage of certain properties of functions known as Wavelets to produce coefficients which, for some categories of defect, have been found to represent the shape more efficiently than coefficients developed using a Fourier transform.

The properties of Wavelets are described generally in the papers entitled "Wavelets and Dilation Equations: A Brief Introduction" by Gilbert Strang in SIAM Review, Vol. 31, No 4, pp 614–627, December 1989 and "Texture Classification and Segmentation using Wavelet Frames" by Michael Unser in IEEE Transactions on Image Processing, Vol. 4, No. 11, pp. 1549–1560, dated November 1995.

The Overcomplete Haar Wavelet Transform (OHWT), described in the above references, produces coefficients which efficiently describe certain complex shapes, particularly those exhibiting numerous sharp discontinuities.

In the operations performed above, shape factors are obtained which are independent of the size, orientation and positioning of the defects.

At step 30 a decision is made to use coefficients developed by a Fourier Transform or a Wavelet Transform. This process is described later.

The selected coefficients are used at step 31 as the input to a neural network as described later to develop a shape factor which is registered at step 32. Also at step 31 the distance values developed at step 29 are compared with those of a reference shape using the process of convolution to derive a measure of the orientation of the hole. This measure is registered at step 33 as the rotation factor.

A damage index ($DI_i$) for the hole being examined (assumed to be the ith hole) is then computed at step **34*i***. For the ith hole:

$DI_i = w_{i1}SF_i + w_{i2}DF_i + w_{i3}LF_i + w_{i4}RF_i$ where $DI_i$=the damage index for the ith defect in the note;
$SF_i$=Shape Factor for the ith defect;
$DF_i$=Dimension Factor for the ith defect;
$LF_i$=Location Factor for the ith defect;
$RF_i$=Rotation Factor for the ith defect;
$w_{i1}$=weight for the Shape Factor of the ith defect;
$w_{i2}$=weight for the Dimension Factor of the ith defect;
$w_{i3}$=weight for the Location Factor of the ith defect;
$w_{i4}$=weight for the Shape Factor of the ith defect;

It should be understood that different weights can be assigned to different factors.

The series of steps 26 to 33 is carried out for each detected hole in turn, and the damage index for that hole is then computed. For example, the damage index for the (i+1)th hole is computed at step 34(i+1), and the damage index for the (i+2)th hole is computed at step 34(i+2).

Finally, a global damage index (GDI) is developed at step 35 for the entire note by summing $DI_i$:

$$GDI = \sum_{i=1}^{n} DI_i$$

where: n is the number of holes in the scanned note 1'.

With regard to the various factors referred to above, the dimension factor (DF) for each hole is directly proportional to the size of the hole. Thus the factor DF is a measurement of the number of pixels for each hole.

The location factor (LF) is relatively high for an edge defect, but is normally relatively low for an inner hole. However, in the case of bank notes which are to be used in a cash dispenser having a vacuum pick mechanism, which mechanism has two suction pads a fixed distance apart, then even a small pinhole located in an area of a bank note which would be contacted by one of the suction pads may cause double picking of notes. Thus, the factor LF is high for holes in such inner locations.

Even though holes of different shape (e.g. a circular hole and an elongated hole) may be of the same size, their shape factors (SF) may be different. Thus, for example, an elongated hole is more likely to reduce the stiffness of a note than does a circular hole, particularly if it is near an edge of the note, and so is more likely to cause problems as regards transportation than a circular hole. Accordingly, the factor SF is higher for an elongated hole than for a circular hole. It should be understood that the factor SF is essentially independent of the size, rotation and positioning of a hole. The image processor 17 employs a pattern recognition approach for identifying each type of shape.

Figure 3:
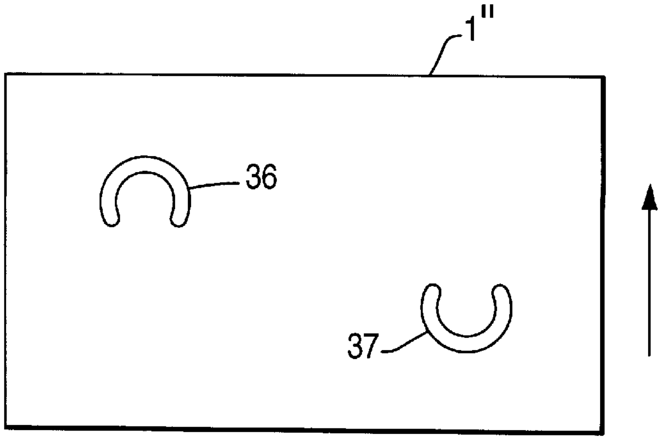
FIG. 3 illustrates the manner in which the orientation of a defect can affect the weighting of a rotation factor.

The damage index (DI) for holes of a certain shape, such as "C" -shaped holes, can vary significantly in dependence on the rotation of a hole with reference to the stored image of a hole of essentially the same shape. Thus, with reference to FIG. 3 in which is shown a bank note 1" having two "C" -shaped holes 36 and 37 therein, the hole 36 for which the central tongue of paper is pointing in the direction of feed indicated by the arrow is more likely to interfere with the transport mechanism and to cause tearing of the note 1' than is the hole 37 which is rotated through 180° with reference to the hole 36. Accordingly the rotation index (RI) is significantly higher for the hole 36 than for the hole 37.

In the image processor 17 there are stored digital images of various reference shapes corresponding to the shapes of holes likely to be found in a bank note. The stored shapes are used for determining the rotation factor (RF) for each hole.

In addition, referring again to FIG. 2, the stored shapes enable appropriate selection of a Fourier transform or a Wavelet transform at step 31. Holes in bank notes may be widely different shapes, ranging from neat circular holes with a clean sharp edge to a ragged hole with a very ill-defined edge. For some holes the Fourier transform is found to provide a more condensed set of coefficients to describe the shape of the hole and is generally more efficient, whereas for others the Wavelet transform is more efficient.

Figure 4:
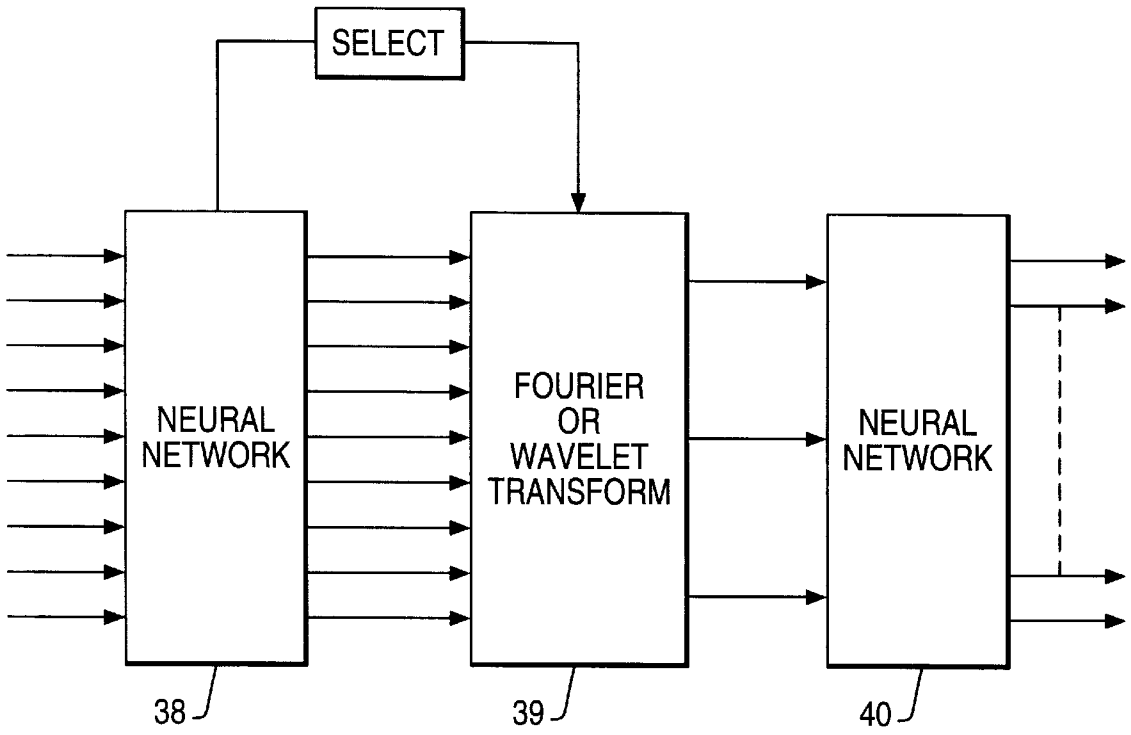
FIG. 4 illustrates the use of neural networks in developing a shape factor and a rotation factor for a defect.

As shown in FIG. 4, the image processor 17 includes a neural network 38 connected to receive the distance values developed at step 29 and to pass these values for transformation at processing means 39 using a Fourier transform or a Wavelet transform according to the likely efficiency of the transform based on efficiencies previously calculated for reference holes and stored in the network 38. Thus, the neural network 38 makes a selection as to whether the processing means 39 will apply a Fourier transform or a Wavelet transform to the distance values applied to the processing means 39. The coefficients developed in the processing means 39 by the selected transform process are applied to a further neural network 40 which develops a shape factor, typically a value between 0 and 10, which represents the shape of the hole as determined by the neural network 40 after comparison with shapes stored therein from previously processed transformation results. As described in the paper entitled "Translation, Rotation and Scale Invariant Pattern Recognition by High—Order Neural Networks and Moment Classifiers" by Stavros J. Perantonis and Paulo J. G. Lisboa, in *IEEE Transactions on Neural Networks,* Vol. 3, No. 2, March 1992, the use of neural networks for correlation is well established in the art and is not described further herein. Although other techniques could be used both to derive the shape factor and to select the type of transform used, a neural network has the major advantage that correlation becomes more effective as the learning process proceeds.

Once the hole shape has been recognized by the neural network 40, the orientation of the hole in relation to that of its previously stored reference counterpart is measured angularly to obtain the rotation factor at step 33. This step is performed by rotating the hole image in relation to that of the reference hole to minimize the difference between the holes, using the mathematical operation of convolution. Once the amount of rotation of the hole with reference to the stored reference counterpart has been determined, a rotation factor (RF), typically between 0 and 10, is assigned to the hole, the factor RF being dependent on the amount of rotation.

Although one form of Wavelet transformation, the Overcomplete Haar Wavelet Transformation (OHWT), has been identified above as being suitable for representing certain defect shapes, other wavelet sets, such as the Daubechies wavelet set may be advantageously used.

What is claimed is:

1. A method of processing a document having a defect in the form of a hole or tear in the document, the method comprising the steps of:

(a) scanning the document to obtain image data associated with the hole or tear in the document;

(b) generating contour signals based upon the image data obtained in step (a);

(c) determining the shape of the hole or tear in the document based upon the contour signals generated in step (b); and (d) computing a damage index for the document based upon the shape of the hole or tear in the document as determined in step (c) to allow a determination to be made as to whether or not to reject the document based upon the damage index.

2. A method a according to claim 1, wherein step (c) further comprises the steps of:

(c-1) comparing the contour signals generated in step (b) with comparable signals describing reference holes or tears; and (c-2) applying a transformation to the contour signals based upon the results of the comparison of step (c-1) to derive a shape factor which is representative of the shape of the hole or tear in the document.

3. A method according to claim 2, wherein the transformation comprises a Fourier transform.

4. A method according to claim 2, wherein the transformation comprises a Wavelet transform.

5. An apparatus for processing a document having a defect in the form of a hole or tear in the document, the apparatus comprising:

a scanner for scanning the document to obtain image data associated with the hole or tear in the document;

means for generating contour signals based upon the image data;

means for determining the shape of the hole or tear in the document based upon the contour signals; and means for computing a damage index for the document based upon the shape of the hole or tear in the document to allow a determination to be made as to whether or not to reject the document based upon the damage index.

6. An apparatus according to claim 5, wherein the means for determining the shape of the hole or tear in the document includes (i) means for comparing the contour signals with comparable signals describing reference holes or tears, and (ii) means for applying a transformation to the contour signals based upon the results of the comparison to derive a shape factor which is representative of the shape of the hole or tear in the document.

7. An apparatus according to claim 6, wherein the transformation comprises a Fourier transform.

8. An apparatus according to claim 6, wherein the transformation comprises a Wavelet transform.

9. A method of processing a document having a defect in the form of a hole or tear in the document, the method comprising the steps of:

(a) scanning the document to obtain image data associated with the hole or tear in the document;

(b) computing at least one configuration factor for the hole or tear in the document based upon the image data obtained in step (a), wherein the at least one configuration factor for the hole or tear comprises shape of the hole or tear in the document; and (c) computing a damage index for the document based upon the at least one configuration factor computed in step (b) to allow a determination to be made as to whether or not to reject the document based upon the damage index.

10. A method of processing a document having a defect in the form of a hole or tear in the document, the method comprising the steps of:

(a) scanning the document to obtain image data associated with the hole or tear in the document;

(b) computing at least one configuration factor for the hole or tear in the document based upon the image data obtained in step (a), wherein the at least one configuration factor for the hole or tear comprises orientation of the hole or tear in the document; and (c) computing a damage index for the document based upon the at least one configuration factor computed in step (b) to allow a determination to be made as to whether or not to reject the document based upon the damage index.

11. An apparatus for processing a document having a defect in the form of a hole or tear in the document, the apparatus comprising:

a scanner for scanning the document to obtain image data associated with the hole or tear in the document;

means for computing at least one configuration factor for the hole or tear in the document based upon the image data, wherein the at least one configuration factor for the hole or tear comprises shape of the hole or tear in the document; and means for computing a damage index for the document based upon the at least one configuration factor to allow a determination to be made as to whether or not to reject the document based upon the damage index.

12. An apparatus for processing a document having a defect in the form of a hole or tear in the document, the apparatus comprising:

a scanner for scanning the document to obtain image data associated with the hole or tear in the document;

means for computing at least one configuration factor for the hole or tear in the document based upon the image data, wherein the at least one configuration factor for the hole or tear comprises orientation of the hole or tear in the document; and means for computing a damage index for the document based upon the at least one configuration factor to allow a determination to be made as to whether or not to reject the document based upon the damage index.

* * * * *